United States Patent [19]

Miyakita et al.

[11] 4,048,885
[45] Sept. 20, 1977

[54] METHOD AND APPARATUS FOR CUTTING CONTINUOUSLY MOVING SHEET MATERIAL BY JET STREAM OF FLUID UNDER HIGH PRESSURE

[75] Inventors: Hiroshi Miyakita; Ichiro Miyakita, both of Toyonaka, Japan

[73] Assignee: Ichiro Miyakita, Toyonaka, Japan

[21] Appl. No.: 666,544

[22] Filed: Mar. 15, 1976

[30] Foreign Application Priority Data

Mar. 17, 1975  Japan .............................. 50-32781
Jan. 30, 1976  Japan .............................. 51-9556

[51] Int. Cl.² .......................... B26F 3/00; B26D 1/56
[52] U.S. Cl. .................................. 83/38; 83/53; 83/177; 83/284; 83/298; 83/353; 83/556; 83/578
[58] Field of Search ............... 83/37, 38, 53, 177, 83/284, 311, 295, 298, 299, 353, 321, 324, 326, 578, 614, 556, 486.1, 486

[56] References Cited

U.S. PATENT DOCUMENTS

| 3,262,419 | 7/1966 | Knight | 83/284 X |
| 3,625,813 | 12/1971 | Eckelman | 83/353 X |
| 3,978,748 | 9/1976 | Leslie et al. | 83/53 |
| 4,007,652 | 2/1977 | Shinomiya et al. | 83/177 X |

*Primary Examiner*—Frank T. Yost
*Attorney, Agent, or Firm*—Pollock, Vande Sande & Priddy

[57] ABSTRACT

A method and apparatus for cutting a continuously moving sheet material in which a nozzle for directing a jet stream of fluid under high pressure is driven in predetermined directions along a closed track consisting of a pair of straight paths intersecting each other symmetrically at a predetermined angle relative to the cutting direction of the sheet material and a pair of curved paths connecting the associated ends of the straight paths. In the method and apparatus, the moving velocity of the jet nozzle is controlled as a function of the feeding velocity of the sheet material and the desired length of sheets cut from the sheet material, and the energy of the fluid under high pressure directed from the moving jet nozzle toward the sheet material is utilized to cut the sheet material into the sheets of desired length.

9 Claims, 14 Drawing Figures

METHOD AND APPARATUS FOR CUTTING CONTINUOUSLY MOVING SHEET MATERIAL BY JET STREAM OF FLUID UNDER HIGH PRESSURE

BACKGROUND OF THE INVENTION

1. Field of the Invention

This invention relates to a method and apparatus for cutting a continuously moving sheet material into sheets of desired length by a jet stream of fluid under very high pressure.

2. Description of the Prior Art

A continuous cutting apparatus is commonly known which is capable of continuously cutting a continuously fed sheet material such as a corrugated cardboard material into sheets of predetermined length in sequence. A rotary shear utilizing the sheet cutting engagement of cutter blades mounted to cutter rolls is widely employed as such a continuous cutting apparatus. However, with the recent tendency toward the increase in both the thickness and the width of sheet materials of the kind above described, the cutter rolls tend to be bent during sheet cutting operation, and the power required for the sheet cutting is increased due to the increase in the weight of the moving parts, resulting in difficulty of operation control including velocity control. Because of the difficulty of the velocity and other control, successful application of the conventional rotary shear to the cutting of the sheet material becomes gradually difficult.

A novel cutting technique has been developed recently according to which a fluid obtained by mixing a polymer in water is jetted from a nozzle at a pressure of about 1,500 to 7,000 kg/cm² for cutting stones and lumber utilizing the energy of the jet stream of fluid under very high pressure. Noting the fact that this jet stream of fluid under very high pressure has very great energy and application of this cutting technique to the cutting of a corrugated cardboard sheet material provides a very beautiful appearance at the cut section, the present invention contemplates an application of this cutting technique to the continuous cutting of a moving sheet material having a large thickness and a large width which is difficult to cut with the conventional rotary shear although not impossible.

SUMMARY OF THE INVENTION

It is an object of the present invention to provide a method and apparatus for cutting a continuously fed sheet material into sheets of predetermined length in sequence using a jet stream of fluid under high pressure.

Another object of the present invention is to provide drive means for causing reciprocating movement of a jet nozzle across a continuously fed sheet material in order to cut the sheet material into sheets of predetermined length in sequence using such jet stream.

DESCRIPTION OF THE PREFERRED EMBODIMENTS

Figure 1:
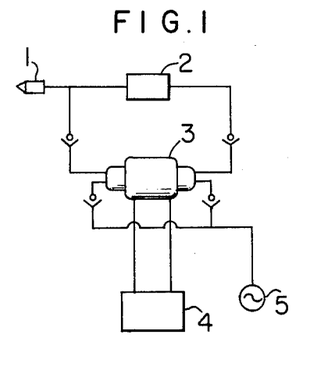
FIG. 1 is a diagrammatic view of a system used in the present invention to direct a jet stream of fluid under high pressure toward a continuously moving sheet material.

FIG. 1 is a diagrammatic view of a system used in the present invention to direct a jet stream of fluid under high pressure toward a continuously moving sheet material. Referring to FIG. 1, the system comprises a nozzle 1, an accumulator 2, an intensifier 3, a source of oil 4, and a source of fluid which may be water containing a polymer. The intensifier 3 is actuated by the hydraulic pressure of oil supplied from the source of oil 4 and acts to intensify the pressure of fluid supplied from the source of fluid 5. The pressure of fluid under very high pressure is controlled to be constant by the accumulator 2, and the fluid under controlled pressure is jetted from the nozzle 1. Such a system is commercially available, for example, sold by Flow Equipment Corporation Kent Washington U.S.A.

Figure 2A:
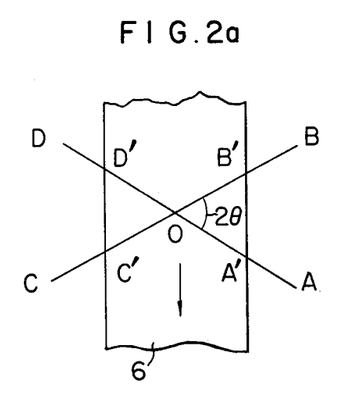
FIGS. 2a and 2b illustrate the basic principle of the present invention.
Figure 2B:
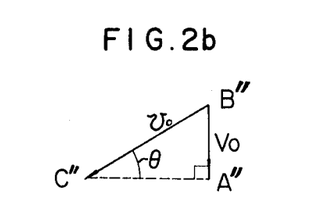

Referring to FIG. 2a, a sheet material 6 such as a corrugated cardboard material is shown moving in a direction as shown by the arrow, and the opposite side edges of the sheet material 6 are designated by B'A' and D'C' respectively. In order that the sheet material 6 can be cut normal to the moving direction thereof by the jet stream of fluid under high pressure directed from the nozzle 1, the nozzle 1 must be moved in a direction of B→C or D→A which makes an angle with the moving direction of the sheet material 6. FIG. 2b is a vector diagram in which the feeding velocity of the sheet material 6 and the moving velocity of the nozzle 1 are represented respectively by B"A" = Vo and B"C" = $v_o$. Since the relation $\sin \theta = V_o/v_o$ holds in FIG. 2b, the sheet material 6 can be precisely cut normal to the moving direction thereof when the moving velocity $v_o$ of the nozzle 1 is selected to be $v_o = V_o/\sin \theta$.

In cutting the sheet material 6 with the jet stream of fluid under high pressure, the nozzle 1 is moved across the sheet material 6 to start cutting at one side and complete cutting at the other side of the sheet material 6. However, due to the difficulty of interrupting the continuous ejection of the fluid under high pressure of 1,500 to 7,000 kg/cm² from the nozzle 1 at the end of the traversing movement of the nozzle 1, the nozzle 1 must be restored to the original starting position without interrupting the ejection of fluid therefrom. Thus, the sheet material 6 is cut by the jet stream of fluid under high pressure again during the returning movement of the nozzle 1.

Therefore, the nozzle 1 is required to initially be moved in the direction of B→C in FIG. 2a to cut the sheet material 6 and then be moved in the direction of D→A to cut the sheet material 6 again. Thus, the direction DA is substantially symmetrical with the direction BC to make an angle θ with the cutting direction. That is, an angle 2θ is defined between the directions DA and BC. This angle θ has the relation described with reference to FIG. 2b and is relatively small when the energy of the jet from the nozzle 1 is high so that high velocity in cutting is available. However, a greater angle is required when the energy of the jet is less.

Figure 3:
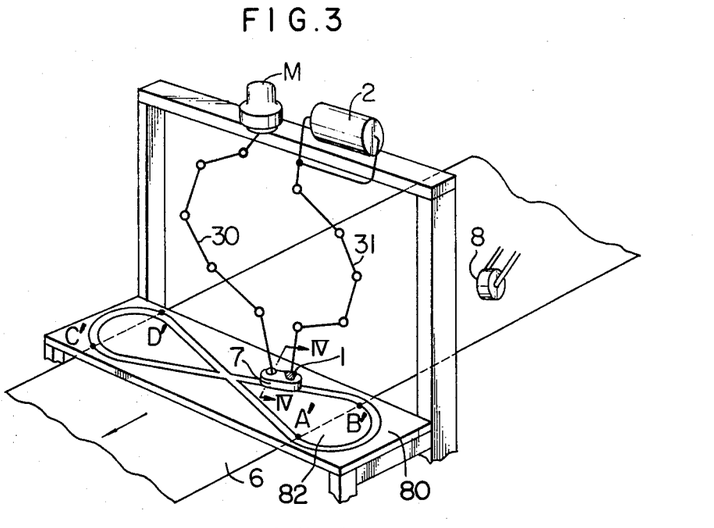
FIG. 3 is a schematic view showing the structure and operation of an embodiment of the present invention.

In an embodiment of the present invention, the nozzle 1 is mounted on a carriage 7 as shown in FIG. 3, and the carriage 7 is driven by an electrohydraulic pulse motor M through a flexible shaft 30 so as to run along a track B'→C'→D'→A'→B'. During the movement of the carriage 7 along this track, the fluid under high pressure is supplied from the accumulator 2 to the nozzle 1 through a flexible tube 31 to be directed toward the moving sheet material 6.

It will be seen in FIG. 3 that the track for the moving carriage 7 includes a pair of straight portions B'C', D'A' and a pair of semicular arc portions C'D', A'B'. It is apparent from FIG. 2a that the straight track portions B'C' and A'D' cross each other at an angle of 2θ. Consider now the most basic operation of the nozzle 1 in which the nozzle 1 is moved continuously at a constant speed of $v_o = V_o/\sin\theta$ along the entire track. Suppose that the overall length of the track is 2l which is constant. Then, the time of $l\sin\theta/V_o$ is required for the nozzle 1 to run the distance l from A' to C'. Since the sheet material 6 is advanced by the distance of $V_o \times (l\sin\theta/V_o) = l\sin\theta$ during this period of time, the length $L_o$ of the sheet cut from the sheet material 6 by the nozzle 1 during this period of time is given by $L_o = l\sin\theta$, and this is the minimum length which can be cut from the sheet material 6 by the cutter.

Figure 5:
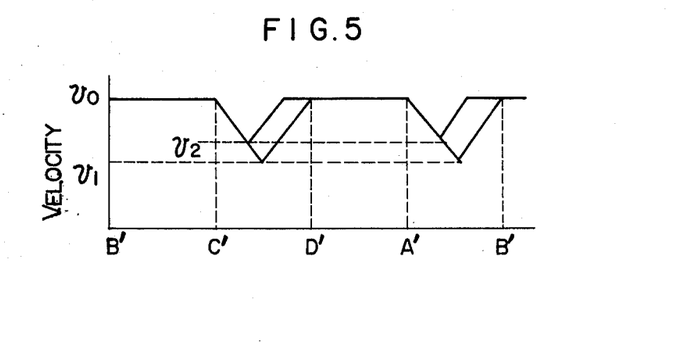
FIG. 5 is a graph showing the relation between the position of the nozzle shown in FIG. 3 and the moving velocity thereof.

In order to cut a desired length which is greater than the minimum length above described, the moving velocity of the carriage 7 is suitably reduced while the nozzle 1 is running between the end of one cut and the start of the next cut. That is, the velocity of the moving carriage 7 is reduced in the curved track portions C'D' and A'B' in the respective cutting cycles C'→D'→A' and A'→B'→C'. Thus, the carriage 7 is run at the constant velocity $v_o$ in the straight track portions B'→C' and D'→A', and the velocity $v_o$ is reduced to $v_1$ in the curved track portions C'→D' and A'→B' as shown in FIG. 5. This velocity $v_1$ is varied depending on the desired length of sheets cut from the sheet material 6 by the nozzle 1. The velocity $v_o$ is reduced to $v_2$ when the desired length of sheets is shorter than that corresponding to the velocity $v_1$. In this latter case, the moving velocity of the carriage 7 is increased from the reduced value $v_2$ to the constant value $v_o$ again before the carriage 7 reaches the point D' or B'. A system adapted for carrying out such manner of velocity control using an electro-hydraulic pulse motor M as shown in FIG. 3 is described in detail in U.S. Pat. No. 4,015,183 entitled "A Rotary Cutter Drive Control with Electro-Hydraulic Pulse Motor" issued March 29, 1977 to H. Miyakita one of the present inventors. This patent relates to a system for driving a rotary cutter using an electro-hydraulic pulse motor, and a control circuit is disclosed to control the drive of the pulse motor. The control circuit employed in the present invention is basically the same as that disclosed in U.S. Pat. No. 4,015,183, but will be described briefly with reference to FIG. 6.

Figure 6:
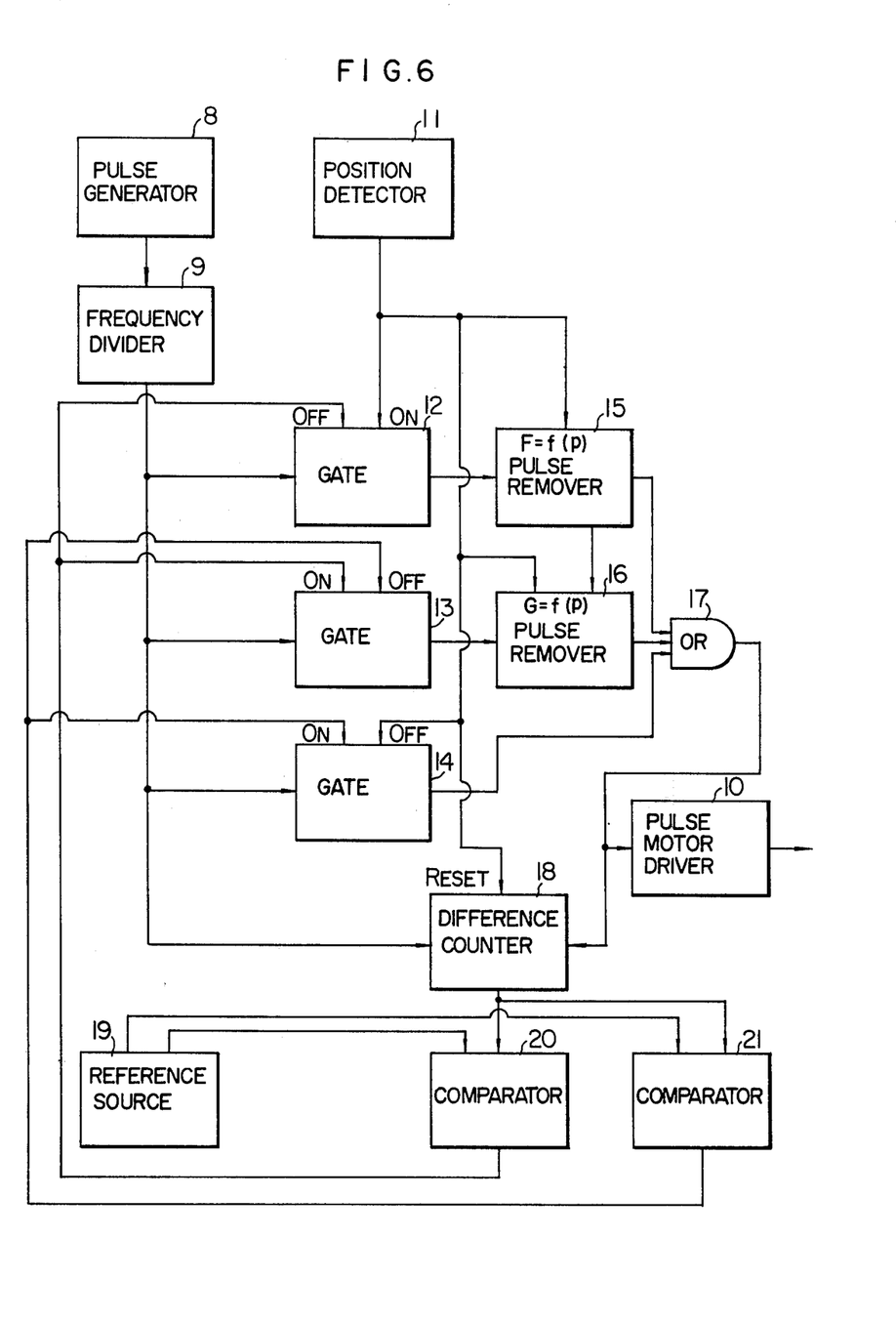
FIG. 6 is a block diagram of a control circuit preferably used in the embodiment of the present invention shown in FIG. 3.

Referring to FIG. 6, a pulse generator 8 generates a train of pulses in synchronism with the feeding velocity of the sheet material 6. This pulse train is applied to the electro-hydraulic pulse motor M. In response to the application of n pulses to the pulse motor M, the nozzle 1 carried by the carriage 7 is moved by the distance l corresponding to the track portions C'→D'→A' or A'→B'→C' in FIG. 4 to complete one cutting cycle following the preceding cutting cycle.

The frequency of the pulse signal generated by the pulse generator 8 is divided according to a predetermined frequency division rate by a frequency divider 9 so that n pulses can be applied to the pulse motor M while the sheet material 6 moves by $L_o = l\sin\theta$. A cut completion position detector 11 is disposed adjacent to each of the points C' and A' to detect the completion of cutting of one sheet from the sheet material 6 by the nozzle 1. Either one of the position detectors 11 generates a pulse when the nozzle 1 reaches the points C' or A' thereby turning on a gate 12, turning off another gate 14 and resetting a pulse removing circuit 15. Due to the turn-on of the gate 12, the train of pulses appearing from the frequency divider 9 are applied to the pulse removing circuit 15 which acts to remove p pulses at a removing rate as described hereinafter from the train of pulses applied thereto. The pulse removing rate increases gradually according to a predetermined function $F = f_1(p)$. The pulses thus extracted from the pulse train appear at the output of the pulse removing circuit 15 to be applied through an OR gate 17 to a pulse motor driver 10 which drives the pulse motor M at a speed corresponding to the pulse rate of the extracted pulses.

During this period, the pulse removing rate increases gradually, and hence the pulse rate of the output pulses of the circuit 15 decreases gradually. Then, the speed of the pulse motor M is gradually reduced. The output of the OR gate 17 is also applied to a difference counter 18. In response to the application of the pulse from one of the position detectors 11, the difference counter 18 is reset and computes the difference between the number of pulses applied directly from the frequency divider 9 and the number of the extracted pulses applied from the pulse removing circuit 15. That is, the difference counter 18 computes the number of removed pulses and applies an output representative of the number of removed pulses to one input terminal of a comparator 20. A reference input is applied to the other input terminal of the comparator 20 from a reference signal source 19. This reference signal source 19 produces two reference output signals representative of $\frac{1}{2}\alpha$ and $\alpha$ which are applied to the comparator 20 and another comparator 21 respectively. The value α is given by $\alpha = n_1 - n$ in which $n_1$ represents the number of pulses appearing from the frequency divider 9 when the sheet material moves a distance equal to the length $L_1$ of sheets cut from the sheet material 6 where $L_1$ is greater than $L_o$.

The output of the comparator 20 is applied to the gate 12 to turn off the same, and also to another gate 13 to turn on the same. Due to the turn-on of the gate 13, the pulse train appearing from the frequency divider 9 is applied through the gate 13 to another pulse removing circuit 16 which acts to remove pulses at a removing rate as described hereinafter from the train of pulses applied thereto. The pulse removing rate decreases gradually according to a predetermined function $G = f_2(p)$. The pulses thus extracted appear at the output the pulse removing circuit 16 to be applied through the OR gate 17 to the pulse motor driver 10 so as to drive the pulse motor M.

During this period, the pulse removing rate of the circuit 16 decreases gradually, and hence the pulse rate of the output pulses of the circuit 16 increases gradually. Thus, the speed of the pulse motor M is gradually increased. The output of the OR gate 17 is applied similarly to the difference counter 18. Thus, the difference between the output of the OR gate 17 and the output of the frequency divider 9, that is, the number of removed pulses is computed continuously by the difference counter 18. Therefore, the output of the difference counter 18 increases from the level representative of $\frac{1}{2} \alpha$ to a higher level. However, a pulse appears from the comparator 21 when the output of the difference counter 18 attains the level representative of $\alpha$, thereby turning off the gate 13 and turning on the gate 14. The pulse train output of the frequency divider 9 passes through the gate 14 and OR gate 17 to be applied to the pulse motor driver 10 which drives the pulse motor M.

The removal of the pulses is carried out when the carriage 7 moves along the curved track portion C'→D' or A'→B', while when the carriage 7 moves along the straight track portion D'→A' or B'→C', the removal of the pulses is not carried out, and it moves at the constant velocity $v_o$ corresponding to the number of pulses applied from the frequency divider 9 to the driver 10. During the movement of the carriage 7, hence the nozzle 1, between the positions associated with the two position detectors 11, that is, during the movement of the nozzle 1 through the distance $l$ from A' to C' or C' to A', $\alpha$ pulses are removed from the pulse train output of the frequency divider 9, and the number of remaining pulses is $n$. Therefore, the number of pulses applied from the frequency divider 9 is given by $\alpha + n = n_1$ which corresponds to the cutting length $L_1$ of one sheet, and the sheet material 6 can be successively cut into sheets of length $L_1$.

Figure 4:
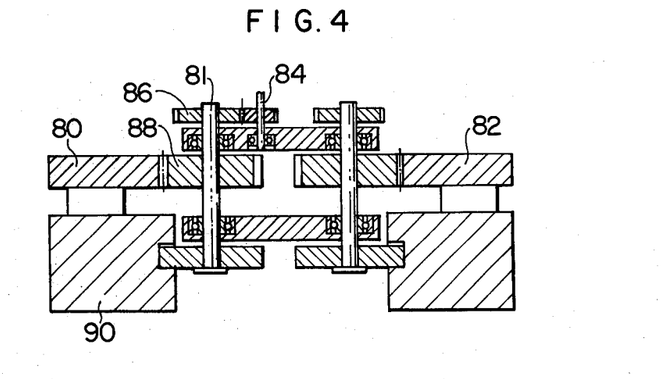
FIG. 4 shows a section of the track along the line IV — IV' in FIG. 3.

A base 80 is provided with a track made in the form of a continuous groove A'→B'→C'→D' defined between the base 80 and central plates 82 which are supported by a suitable frames (not shown) under the base so as not to prevent the movement of the carriage 7 along the track shown in FIG. 4. As shown in FIG. 4, the track is formed between the base 80 and the central plate 82 which have racks formed at the sides thereof opposing each other, while the carriage is provided with a driving shaft 84 which is connected through the flexible shaft 30 to the drive motor M, a main shaft 81 gear-meshed with the driving shaft 84, a pinion 88 which is fixed to the main shaft 81 and engaged with the rack of the base 80, and a wheel 83 which is also fixed to the main shaft 81 and loosely fitted into a groove formed in a groove of a guide 90 fixed to the base 80. Thus, the carriage 7 can be driven by the meshing engagement of the pinions with the rack. Further, the lengths A'C' and B'D' in FIG. 4 are selected to be slightly larger than the maximum width of sheet materials which can be cut by the cutter.

In the embodiment described hereinbefore, the carriage is arranged to move along a track including a pair of straight portions intersecting each other. Thus, when the moving velocity of the carriage is increased, the carriage may be subjected to irregular vibration at the intersection of the straight track portions, and the cut surface of the sheets may be adversely affected by this vibration.

Figure 7:
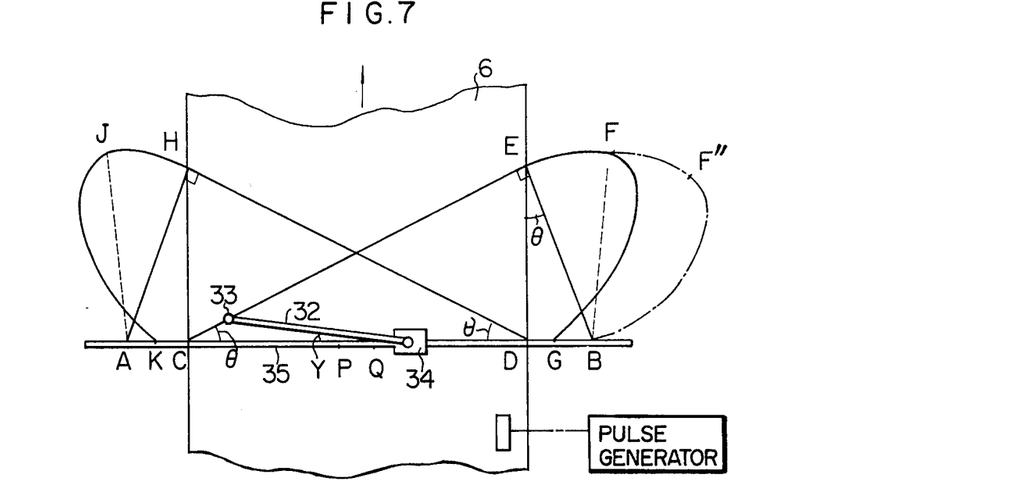
FIGS. 7 and 8 are schematic views showing the basic structure of another embodiment of the present invention.
Figure 8:
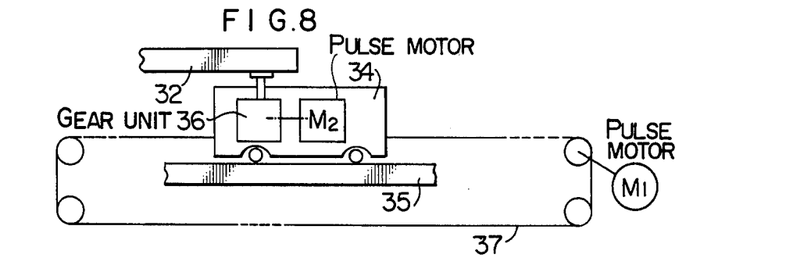

In another embodiment of the present invention shown in FIGS. 7 and 8, a carriage is arranged to move along a track which does not include such an intersection.

Referring to FIG. 7, a sheet material 6 is shown as having a maximum width and is fed at a predetermined velocity in a direction as shown by the arrow. A nozzle 33 for directing a jet stream of fluid such as water under very high pressure is mounted at one end of an arm 32 of rigid material such as steel. The arm 32 is pivoted at the other end thereof to a carriage 34. This carriage 34 is driven by an electro-hydraulic pulse motor $M_1$ through a belt or chain 37 so as to make reciprocating movement along a track 35 extending normal to the advancing direction of the sheet material 6 as shown in FIG. 8. Another electro-hydraulic pulse motor $M_2$ is mounted on the carriage 34 to cause swinging movement of the arm 32 through a gear unit 36.

The pulse motor $M_2$ may be mounted fixedly to a frame structure (not shown) of the apparatus and mechanically connected through a flexible shaft to the gear unit 36 in a well-known manner.

In this second embodiment, the carriage 34 is adapted for making reciprocating movement along the track 35 instead of directly driving the nozzle 33, and the arm 32 connected to the carriage 34 is adapted for making clockwise or counter-clockwise swinging movement in FIG. 7 around the pivot, so that the nozzle 33 can be moved along an 8-like route C–E–F–G–D–H–J–K–C. Thus, it is unnecessary to employ a track including an intersection, and the weight of the moving parts can be reduced by mounting separately the pulse motor $M_2$.

The elongated sheet material 6 moving in the direction of the arrow in FIG. 7 is cut normal to the moving direction thereof into sheets of predetermined length by the jet stream of fluid under high pressure directed from the nozzle 33. In order that the sheet material 6 can be cut into the sheets of predetermined length, the nozzle 33 must move along the 8-like route C–E–F–G–D–H–J–K–C at a velocity controlled depending on the feeding velocity of the sheet material 6 and the length of sheets cut from the sheet material 6.

Suppose now that the straight portions CE and DH of the 8-like route cross the track 35 at a selected angle $\theta$, and the sheet material 6 having a maximum width CD = W is fed at a velocity Vo to be cut into sheets of predetermined length L. Then, the sheet material 6 can be cut normal to the advancing direction thereof when the moving velocity $v_o$ of the nozzle 33 is selected to satisfy the relation $$v_o = Vo/\sin \theta \tag{1}$$

While the nozzle 33 moves along the route portion CE at the velocity $v_o$, the other end of the arm 32, hence the carriage 34 shifts from a point P to a point B. The line BE is selected to be normal to the straight route portion CE, and the length S of the arm 32 is selected to be equal to the line BE. Therefore, $$CP = BE = S \tag{2}$$

$$BD = BE \sin \theta = S \sin \theta \tag{3}$$

$$CB = W + S \sin \theta \tag{4}$$

Suppose now that $x$ and $\gamma$ are the distance between the carriage 34 and the point C, and the angle defined between the arm 32 and the track AB respectively. Then, the distance $y$ between the nozzle 33 and the point C is given by $$y = \frac{x - S\cos\gamma}{\cos\theta} = \frac{x}{\cos\theta} - \frac{S}{\cos\theta}\cdot\cos\gamma \quad (5)$$

Therefore, the velocity $v$ of the nozzle 33 in the direction CE is given by $$v = \frac{dy}{dt} = \frac{1}{\cos\theta}\cdot\frac{dx}{dt} + \frac{S}{\cos\theta}\cdot\sin\gamma\frac{d\gamma}{dt} = \frac{Vo}{\sin\theta} \quad (6)$$

Since $y\sin\theta = S\sin\gamma$, the following relations are obtained from the equation (5):

$$\frac{S\sin\gamma}{\sin\theta} = \frac{x}{\cos\theta} - \frac{S\cos\gamma}{\cos\theta} \quad (7)$$

$$\therefore x = \frac{S\cos\theta}{\sin\theta}\cdot\sin\gamma + S\cos\gamma$$

$$\frac{dx}{dt} = \frac{S\cos\theta}{\sin\theta}\cdot\cos\gamma\cdot\frac{d\gamma}{dt} - S\sin\gamma\cdot\frac{d\gamma}{dt} \quad (8)$$

From the equations (6), (7) and (8), $dx/dt$ and $d\gamma/dt$ for various values of $x$ can be computed. That is, the moving velocity of the carriage 34 along the portion P→B of the track and the angular velocity of the swinging arm 32 within the above range can be computed.

Further, letting $x = S$ and $\gamma = 0$ in the equation (6), the moving velocity $v$ of the carriage 34 at the point P is expressed as $$v = \frac{Vo}{\sin\theta} = \frac{1}{\cos\theta}\cdot(\frac{dx}{dt})x = cp$$

$$(\frac{dx}{dt})x = cp = Vo\cdot\frac{\cos\theta}{\sin\theta}$$

From the equation (8), the following relation is obtained:

$$(\frac{dx}{dt})x = 1 = \frac{Vo}{S}$$

Since $\gamma = 90° - \theta$ when the carriage 34 arrives at the point B, $dx/dt = 0$ in the equation (8), and the equation (6) is expressed as $$v = \frac{Vo}{\sin\theta} = S\cdot(\frac{d\gamma}{dt})x = CB$$

$$(\frac{d\gamma}{dt})x = CB = \frac{Vo}{S\sin\theta}$$

It will be seen from the above computation that, in order to drive the nozzle 33 at the constant velocity $v_o = Vo/\sin\theta$ in the range CE, the moving velocity of the carriage 34 along the track 35 be $Vo$. $(\cos\theta/\sin\theta)$ at the point P, zero at the point B and the values computed from the equations (6), (7) and (8) at intermediate points, and the angular velocity of the swinging arm 32 be $Vo/S$ at the point P, $(Vo/S\sin\theta)$ at the point B and the values computed from the equations (6), (7) and (8) at intermediate points. The moving velocity of the carriage 34 is highest at the point P and zero at the point B as will be apparent from the above description. On the other hand, the angular velocity of the swinging arm 32 increases with the movement of the carriage 34 from the point P toward the point B.

During the movement of the nozzle 33 along the route portion DH, the operation of the carriage 34 and arm 32 is entirely symmetrical with the operation above described. Thus, the carriage 34 moves from the point Q toward the point A along the track, and the arm 32 swings counter-clockwise in FIG. 7.

In the case of the movement of the nozzle 33 from the point E toward the point D (or in the case of the movement of the nozzle 33 from the point H toward the point C), the following two conditions must be taken into account:

1. A sheet of predetermined length L is cut from the sheet material 6 when the sheet material 6 is advanced by (L − $\overline{\text{ED}}$) during the movement of the nozzle 33 along the curved portion EFGD of the route. However, due to the fact that the value of L varies depending on the order, the moving velocity of the nozzle 33 along the route portion EFGD must be controlled depending on the desired value of L.

2. The moving velocity of the nozzle 33 at the points E and D is constant or $v_o = Vo/\sin\theta$ as described hereinbefore. The combination of the linear movement of the carriage 34 and the swinging movement of the arm 32 provides the movement of the nozzle 33. When the nozzle 33 arrives at the point E, the carriage 34 arrives at the point B, and the linear velocity of the carriage 34 at this point B is zero. Since the moving direction of the carriage 34 is reversed at the point B, the carriage 34 is preferable to be held stationary at this point B for a certain period of time, and the nozzle 33 is urged by the swinging movement of the arm 32 only during this period of time. Thus, the route portion EF is selected to be a part of a circle which is drawn around the point B and has a radius equal to the length S = BE of the arm 32. Further, when the nozzle 33 arrives at the point D, the arm 32 lies on the line QD, and thereafter, the swinging direction of the arm 32 is changed from clockwise to counter-clockwise in FIG. 7. Therefore, when the nozzle 33 arrives at the point G, the arm 32 lies on the track AB. During the movement of the nozzle 33 from the point G to the point D, the arm 32 does not make any swinging movement, and the movement of the nozzle 32 is merely provided by the linear movement of the carriage 34. During this range, the arm 32 is controlled so that the swinging direction thereof can be changed.

The above description has referred to the basic manner of control for causing desired movement of the carriage 34 and arm 32 so as to guide the nozzle 33 along the straight route portion CE (or DH) and curved route portion EFGD (or HJKC). A practical embodiment for attaining such manner of control will be described with reference to FIGS. 9, 10 and 11.

Figure 9:
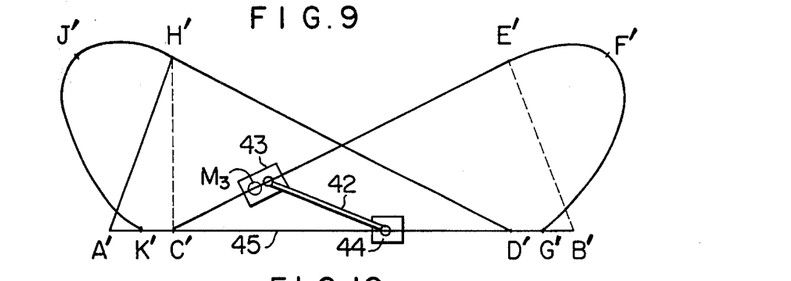
FIGS. 9 and 10 are schematic views showing the basic structure of a simulated panel used for simulation of the operation of the embodiment shown in FIG. 7.
Figure 10:
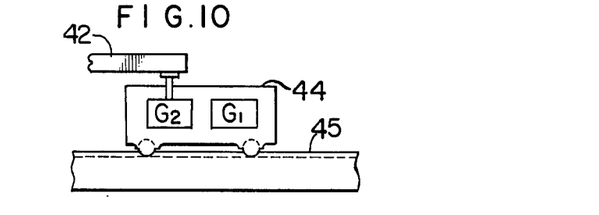

In this embodiment, the route C-E-F-G-D-H-J-K-C, along which the nozzle is to be guided, is determined on the basis of the basic idea above described, and a simulated route C'-E'-F'-G'-D'-H'-J'-K'-C' which is entirely the same as or similar to the route above described is provided as shown in FIG. 9. A vehicle 43 driven by an electro-hydraulic pulse motor $M_3$ is adapted to move along this route, and an arm 42 is pivoted at one end thereof to the vehicle 43. A straight track 45 is provided in a positional relation similar to the track 35 in FIG. 7, and a carriage 44 is arranged to move along this track 45. The arm 42 is pivoted at the other end thereof to the carriage 44 as shown in FIG. 10, and a pulse generator $G_2$ is connected to the pivot so as to generate a train of pulses the number of which is proportional to the swinging angle of the arm 42 around the pivot. Another pulse generator $G_1$ is and connected to a friction wheel (not shown) which is mounted on the carriage 44 in friction contact with the track 45 so that the generator $G_1$ generates a train of pulses the number of which is proportional to the moving distance of the carriage 44 moving along the track 45. The generators $G_1$ and $G_2$ may be mounted to a frame structure (not shown) of the apparatus and connected through flexible shafts to the wheel and the pivot, respectively. In fact, the simulated route C'-E'-F'-G'-D'-H'-J'-K'-C', vehicle 43, carriage 44 and arm 42 correspond to the route C-E-F-G-D-H-J-K-C, nozzle 33, carriage 34 and arm 32 respectively in FIG. 4 and provide a simulated panel in which the former elements have the same sizes as those of the latter elements or the sizes of the former are reduced in the same scale relative to the latter.

The vehicle 43 is driven along the route C'-E'-F'-G'-D'-J'-H'-K'-C' on this simulated panel, and the number of pulses applied to the pulse motor $M_3$ is controlled so as to move the vehicle 43 along the straight route portions C'E' and D'H' at a constant velocity $v_o = Vo/\sin \theta$ (when the scale is 1 : 1) and so that the velocity pattern corresponding to the cut length L can be obtained on the curved route portions. This manner of velocity control is entirely the same as that as described with reference to FIGS. 5 and 6. The arm 42 moves with the movement of the vehicle 43 along the simulated route. The movement of the arm 42 is decomposed into the swinging movement of the arm 42 around the point pivoted to the carriage 44 and the linear movement of the carriage 44 along the track A'B'. The pulse generator $G_2$ generates pulses corresponding to the swinging angle of the arm 42 around the pivot, and the pulse generator $G_1$ generates pulses corresponding to the moving distance of the carriage 44 moving along the straight track A'B'.

Figure 11:
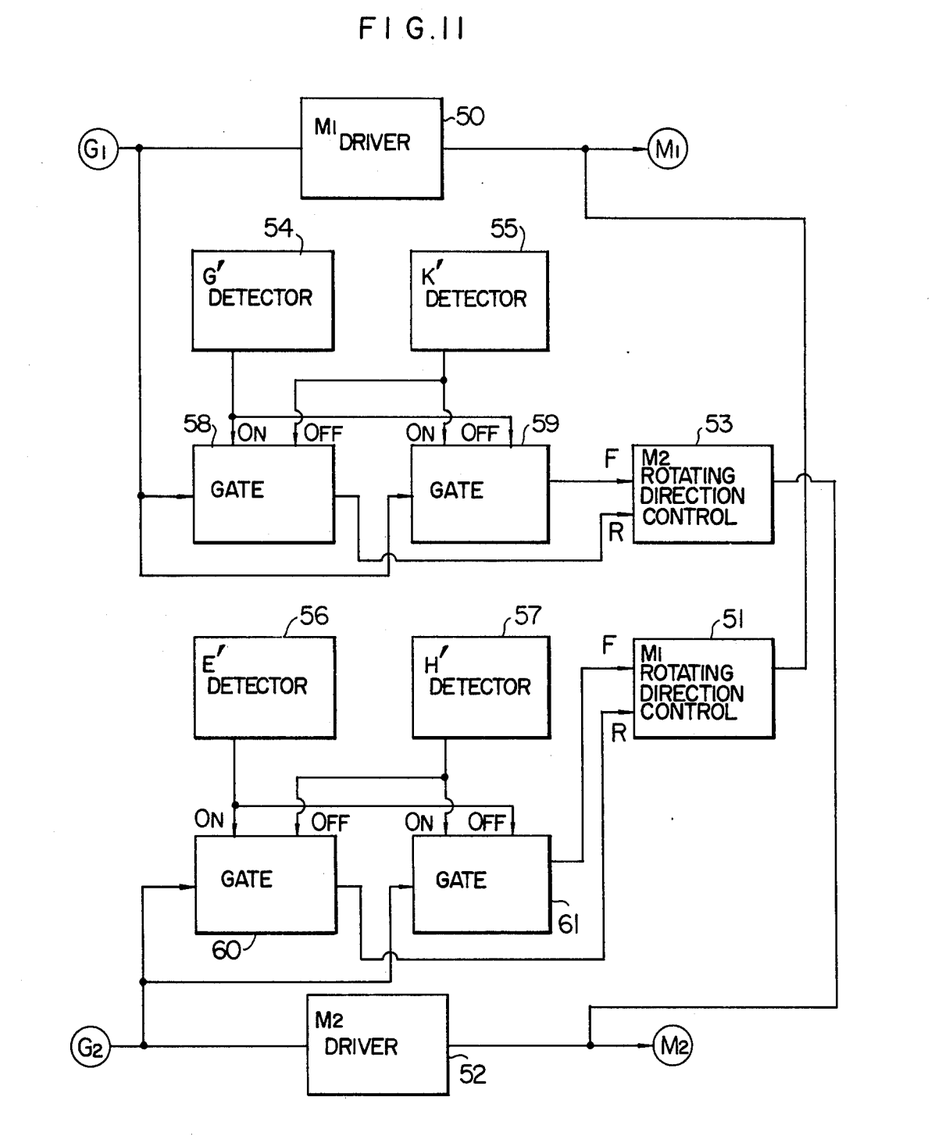
FIG. 11 is a block diagram of a control circuit preferably used to control the pulse generators in the simulated panel shown in FIGS. 9 and 10.

Now, referring to FIG. 11 the output pulses from the generators $G_1$ and $G_2$ are respectively applied to the carriage driving pulse motor $M_1$ and arm driving pulse motor $M_2$. When the vehicle 43 arrives at the point E', a pulse appears from a position detector 56 disposed adjacent to the point E' to turn on a gate 60 and turn off another gate 61. A pulse generated by the pulse generator $G_2$ passes through the gate 60 to be applied to a terminal R of a control unit 51 which controls the direction of rotation of the pulse motor $M_1$. As a result, the control unit 51 acts to reverse the direction of rotation of the pulse motor $M_1$. Therefore, the pulse motor $M_1$ is rotated in the reverse direction by the pulses applied to a driver 50 from the pulse generator $G_1$, and the carriage 34 is driven to move from the point B toward the point A in FIG. 7. When the vehicle 43 arrives at the point H', a pulse appears from another position detector 57 disposed adjacent to the point H' to turn on the gate 61 and turn off the gate 60. A pulse generated by the pulse generator $G_2$ passes through the gate 61 to be applied to a terminal F of the control unit 51. As a result, the control unit 51 acts to drive the pulse motor $M_1$ in the normal direction, and the carriage 34 is moved from the point A toward the point B in FIG. 7. Similarly, the pulse motor $M_2$ is controlled to be rotated in the reverse direction and normal direction respectively by another control unit 53 associated with similar gates 58, 59 and detectors 54, 55 when the vehicle 43 arrives at the points G' and K'. Due to the fact that the pulse motors $M_1$ and $M_2$ are respectively driven by the pulses applied to the drivers 50 and 51 from the pulse generators $G_1$ and $G_2$, the carriage 34 and arm 32 in FIG. 7 make linear movement and swinging movement respectively as following the movement of the carriage 44 and arm 32 on the simulated panel, and the nozzle 33 in FIG. 7 makes movement as following the movement of the vehicle 43 on the simulated panel.

In this embodiment irregular oscillation may be imparted to the vehicle 43 when it moves past the intersection in the simulated route, but any substantial adverse effect is not imparted to the nozzle 33 since the nozzle 33 and vehicle 43 are entirely mechanically isolated from each other.

In FIG. 7, the nozzle 33 moves along the route portions C-E-F-G-D at the constant velocity $v_o = Vo/\sin \theta$. In this case, the velocity of the moving carriage 34 and the angular velocity of the swinging arm 32 are determined as a function of the position of the nozzle 33 when the feeding velocity of the sheet material 6 is constant. These values can be computed from the equations (6), (7) and (8) when the nozzle 33 moves along the straight route portion CE. These values can also be experimentally sought in the case of the curved route portion EFGD. (In this latter case, these values can be computed by preparing the simulated panel shown in FIG. 9 and moving the vehicle 43 along the simulated route to measure the velocity of the moving carriage 44 and the angular velocity of the swinging arm 42, or by measuring the position of the carriage 44 and the swinging angle of the arm 42 relative to the moving nozzle on a drawing and computing the velocity of the carriage 44 and the angular velocity of the arm 42 by approximation.)

Figure 12:
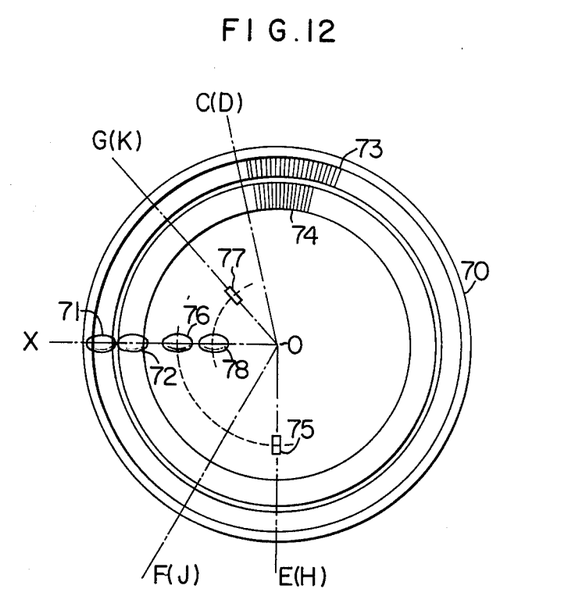
FIGS. 12 and 13 are schematic views showing the basic structure of another form of the pulse generating means used in the embodiment shown in FIG. 7.
Figure 13:
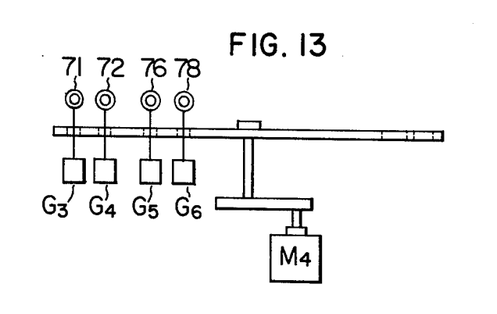

Referring to FIGS. 12 and 13 showing another form of the pulse generating means employed in the present invention, a pair of radially spaced trains slots 73 and 74 are formed on a disc 70 on the basis of the values obtained by computation in the manner above described. The disc 70 is rotated by an electro-hydraulic pulse motor $M_4$ as shown in FIG. 13, and a pair of light sources 71 and 72 and a pair of photoelectric elements $G_3$ and $G_4$ are respectively disposed on opposite sides of the disc 70 opposite to the slot trains 73 and 74 in registering relation on a reference axis OX passing through the center O of the disc 70. Therefore, when the disc 70 rotates, pulse outputs corresponding respectively to the number of slots of the slot trains 73 and 74 appear from the photoelectric elements $G_3$ and $G_4$. One complete rotation of the disc 70 correspond to the movement of the nozzle 33 along the route portions C-E-F-G-D (or D-H-J-K-C) in FIG. 7, i.e. one cutting cycle of the operation. Further, the slot densities in the respective slot trains 73 and 74 are selected to correspond to the velocity of the moving carriage 34 and the angular velocity of the swinging arm 32 both of which are computed as the function of the position of the nozzle 33, as described before.

The electro-hydraulic pulse motor $M_4$ is driven so that the disc 70 can make one complete rotation while one sheet of predetermined length L is cut from the moving sheet material 6. The pulse outputs appearing from the photoelectric elements $G_3$ and $G_4$ during one complete rotation of the disc 70 are respectively used to drive the carriage driving pulse motor $M_1$ and arm driving pulse motor $M_2$, so that one sheet of predetermined length L can be cut from the moving sheet material 6 during the movement of the nozzle 33 along the route portions C-E-F-G-D (or D-H-J-K-C). It will be readily understood that the moving velocity of the nozzle 33 varying depending on the feeding velocity of the sheet material 6 and on the length L of sheets cut from the sheet material 6 can be controlled by controlling the number of pulses applied to the electro-hydraulic pulse motor $M_4$.

A control circuit similar to that shown in FIGS. 6 or 11 is also applicable for this control. In the form shown in FIGS. 12 and 13, the position detector 11 shown in FIG. 6 for detecting the position E(H) in FIG. 7 is replaced by the combination of a slot 75 formed on the disc 70 at the position corresponding to the nozzle position E(H) and a light source 76 and a photoelectric element $G_5$ disposed opposite to the slot 75 on opposite sides of the reference axis OX on the disc 70. Further, the driver 10 for driving the electro-hydraulic pulse motor M in FIG. 6 is used to drive the pulse motor $M_4$ in FIG. 13, and the pulse outputs of the photoelectric elements $G_3$ and $G_4$ are used in lieu of the outputs of the pulse generators $G_1$ and $G_2$ in FIG. 11. Further, the combination of a slot 77, a light source 78 and a photoelectric element $G_6$ is employed in FIGS. 12 and 13 to replace the position detector 54 in FIG. 11 disposed to detect the movement of the vehicle 43 past the point G'. The position detector 55 disposed in FIG. 11 to detect the movement of the vehicle 43 past the point K' is unnecessary, and the gate 59 is also unnecessary, and the gate 59 is also unnecessary. Similarly, the photoelectric element $G_5$ replaces the position detector 56 disposed for detecting the movement of the vehicle 43 past the point E'. The position detector 57 disposed for detecting the movement of the vehicle 43 past the point H' is unnecessary, and the gate 61 is also unnecessary.

In the form shown in FIGS. 12 and 13, preparation of the simulated route shown in FIG. 9 is unnecessary, and a disc may merely be slotted on the basis of the results obtained by calculation of the velocity of the moving carriage 34 and the angular velocity of the swinging arm 32 relative to the position of the nozzle 33. Thus, the structure of the apparatus can be simplified. The most preferable pattern of the curved portion EFGD of the route for the moving nozzle 33 is to be experimentally determined depending on the design of the apparatus. However, even when it is necessary to alter the pattern of the curved route portion, such alteration can be relatively easily done since it is merely required to calculate the velocity of the moving carriage 34 and the angular velocity of the swinging arm 32 for various patterns on a drawing.

Further, the curved portion of the route for the moving nozzle 33 may have any desired pattern depending on the length of the sheet cut from the sheet material 6. For example, the nozzle 33 may move along the short curved route portion EFGD shown by the solid line in FIG. 7 when the length of the sheet cut from the sheet material 6 is relatively small, while it may move along a longer curved route portion EFF"GD shown by the one-dot chain line in FIG. 7 when the length of the sheet cut from the sheet material 6 is relatively large. In any case, the velocity of the moving carriage 34 and the angular velocity of the swinging arm 32 used for controlling the movement of the nozzle 33 can be simply computed on a drawing. Thus, the route for the nozzle 33 can be freely altered by merely providing corresponding slots in the disc 70 without requiring any alteration of other parts of the apparatus. Further, a plurality of discs of various control modes may be prepared, and the most suitable one of them may be selected to meet the cutting conditions required for a specific sheet material.

Although a disc provided with slots for providing required control pulses is illustrated in FIGS. 12 and 13 by way of example, it is apparent to those skilled in the art that the same objective can be achieved by employing any other suitable element such as a magnetic tape or punched tape.

We claim:

1. A method of cutting a web of sheet material continuously fed at a predetermined velocity into sheets of predetermined length, comprising moving alternately a high-pressure fluid jet nozzle at a predetermined velocity along a first straight path and then a second straight path intersecting each other and inclining symmetrically at a predetermined angle relative to the cutting direction of the sheet material, and directing a jet stream of fluid under high pressure from said nozzle toward said sheet material thereby cutting said sheet material into sheets of predetermined length utilizing the energy of the fluid under high pressure.

2. A method of cutting a web of sheet material continuously fed at a predetermined velocity into sheets of predetermined length, comprising the first cutting step of moving a high-pressure fluid jet nozzle along a first straight path extending across said sheet material and inclining at a predetermined angle relative to the cutting direction of said sheet material and directing a jet stream of fluid under high pressure from said nozzle toward said sheet material thereby cutting one sheet from said sheet material, the second cutting step of moving said nozzle along a second straight path inclining relative to the sheet cutting direction in symmetrical relation with and at the same angle as said first straight path and directing the jet stream of fluid under high pressure from said nozzle toward said sheet material thereby cutting the next sheet from said sheet material, the first shifting step of shifting said nozzle from the terminating position of said first straight path to the starting position of said second straight path between said first and second cutting steps, and the second shifting step of shifting said nozzle from the terminating position of said second straight path to the starting position of said first straight path upon completion of said second cutting step, the moving velocity of said nozzle during said first and second cutting steps and the period of time required for shifting said nozzle during said first and second shifting steps being controlled respectively as a function of the feeding velocity of said sheet material and the angle of inclination of said first and second straight paths relative to the cutting direction of said sheet material, and as a function of the feeding velocity of said sheet material and the length of the sheets cut from said sheet material.

3. An apparatus for cutting a web of sheet material continuously fed at a predetermined velocity into sheets of predetermined length by a jet stream of fluid under high pressure, comprising a jet nozzle capable of ejecting a jet stream of fluid under high pressure having energy sufficient to cut said sheet material, a track in closed loop form consisting of a pair of straight paths intersecting each other and inclining symmetrically at a predetermined angle relative to the cutting direction of said sheet material and a pair of curved paths connecting the associated ends of said straight paths, a carriage carrying said nozzle and adapted to move along said track, drive means for driving said carriage, and control means for controlling the moving velocity of said carriage as a function of the feeding velociting of said sheet material and the length of sheets cut from said sheet material.

4. An apparatus as claimed in claim 3, wherein said drive means comprises an electro-hydraulic pulse motor for driving said carriage, and said control means comprises pulse control means for controlling the pulse rate of pulses applied to said electro-hydraulic pulse motor in such a manner that the pulse rate of the pulses applied to said pulse motor is proportional to the feeding velocity of said sheet material when said carriage moves along said straight paths in said track, while when said carriage moves along said curved paths in said track, the pulse rate of pulses applied to said pulse motor is decreased the decrease of said pulse rate being a function of the length of the sheets cut from said sheet material.

5. An apparatus for cutting a web of sheet material continuously fed at a predetermined velocity into sheets of predetermined length by a jet stream of fluid under pressure, comprising a jet nozzle for directing a jet stream of fluid under high pressure having energy sufficient to cut said sheet material, a carriage adapted for making reciprocating movement along a straight track, an arm mounting said nozzle at one end thereof and pivoted at the other end thereof to said carriage, and drive means for causing reciprocating movement of said carriage along said straight track at a controlled velocity and causing alternate normal and reverse swinging movement of said arm around the pivot at a controlled angular velocity.

6. An apparatus as claimed in claim 5, wherein said drive means comprises a first electro-hydraulic pulse motor for driving said carriage along said straight track, a second electro-hydraulic pulse motor for swinging said arm around said pivot, and pulse generating means for generating a first and a second train of pulses for driving said first and second electro-hydraulic pulse motors respectively, the number of pulses in said first and second pulse trains being controlled as a function of the feeding velocity of said sheet material and the length of sheets cut from said sheet material.

7. An apparatus as claimed in claim 6, wherein said pulse generating means comprises control pulse recoading means for reproducibly recording a first train of pulses for controlling the moving velocity of said carriage along said straight track as a function of the position of said jet nozzle along the moving path and a second train of pulses for controlling the angular velocity of swinging movement of said arm, and reproducing rate control means for controlling the rate of reproduction of said first and second pulse trains from said control pulse recording means as a function of the feeding velocity of said sheet material and the length of the sheets cut from said sheet material.

8. An apparatus as claimed in claim 6, wherein said control pulse generating means comprises a simulated path having the same pattern as the predetermined path of said jet nozzle, a vehicle movable along said simulated path at a controlled velocity, an arm connected at one end thereof to said vehicle, a simulated carriage having the other end of said arm pivoted thereto, a simulated straight track guiding said simulated carriage, a first pulse generator generating a train of pulses corresponding to the moving velocity of said simulated carriage moving along said simulated straight track, a second pulse generator generating a train of pulses corresponding to the angular velocity of said arm swinging relative to said simulated carriage, and means for controlling the velocity of said vehicle moving along said simulated path as a function of the feeding velocity of said sheet material and the length of the sheets cut from said sheet material.

9. An apparatus as claimed in claim 6, wherein said pulse generating means comprises a recording medium movable at a controlled velocity, a first and a second train of marks arranged on said recording medium in the moving direction thereof and having densities respectively corresponding to the moving velocity of said carriage and the angular velocity of said arm computed previously as a function of the position of said jet nozzle, means for generating a first and second train of pulses by detecting said first and second mark trains with the movement of said recording medium, and means for controlling the moving velocity of said recording medium as a function of the feeding velocity of said sheet material and the length of the sheets cut from said sheet material.

* * * * *